United States Patent
Scriffignano et al.

(12)

(10) Patent No.: US 9,390,176 B2
(45) Date of Patent: Jul. 12, 2016

(54) SYSTEM AND METHOD FOR RECURSIVELY TRAVERSING THE INTERNET AND OTHER SOURCES TO IDENTIFY, GATHER, CURATE, ADJUDICATE, AND QUALIFY BUSINESS IDENTITY AND RELATED DATA

(71) Applicant: THE DUN & BRADSTREET CORPORATION, Short Hills, NJ (US)

(72) Inventors: Anthony J. Scriffignano, West Caldwell, NJ (US); Michael Klein, Chatham, NJ (US); Thang Q. Hoang, Hackettstown, NJ (US); Vindra Rampaul, Saylorsburg, PA (US); Robin Davies, Mancungie, PA (US); Anjali Reddi, Martinsville, NJ (US)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 0 days.

(21) Appl. No.: 14/047,837

(22) Filed: Oct. 7, 2013

(65) Prior Publication Data
US 2014/0101124 A1 Apr. 10, 2014

Related U.S. Application Data

(60) Provisional application No. 61/711,673, filed on Oct. 9, 2012.

(51) Int. Cl.
*G06F 17/30* (2006.01)
(52) U.S. Cl.
CPC .............................. *G06F 17/30864* (2013.01)
(58) Field of Classification Search
None
See application file for complete search history.

(56) References Cited

U.S. PATENT DOCUMENTS

| 7,392,240 B2 | 6/2008 | Scriffignano et al. |
| 8,484,199 B1 * | 7/2013 | Katragadda ....... G06F 17/30241 701/426 |
| 2005/0165778 A1 | 7/2005 | Obata et al. |
| 2005/0278309 A1 * | 12/2005 | Evans ................. G06F 17/3087 |
| 2007/0038620 A1 * | 2/2007 | Ka .................... G06F 17/30864 |

(Continued)

FOREIGN PATENT DOCUMENTS

TW  200903280 A  1/2009

OTHER PUBLICATIONS

U.S. Appl. No. 61/541,627, filed Sep. 30, 2011.*
International Search Report, dated Dec. 30, 2013, corresponding from International Application No. PCT/US2013/063737, 2pgs.
Written Opinion, dated Dec. 30, 2013, corresponding from International Application No. PCT/US2013/063737, 6pgs.

(Continued)

*Primary Examiner* — Jay Morrison
(74) *Attorney, Agent, or Firm* — Ohlandt, Greeley, Ruggiero & Perle, L.L.P.

(57) ABSTRACT

A system and a method used for data discovery in accordance with an inquiry in which multiple sources, which may be web sites or other data sources, are examined for data relevant to the inquiry. The process and method is performed recursively an indeterminate number of iterations, using data and metadata from multiple sources to corroborate discovered data and metadata from other sources, until no further relevant data or sources are found, or adjudication or exception rules have been met. Discovered data and metadata are curated, adjudicated to assess reliability, synthesized, and clustered into composite records using precedence rules and provenance to determine the most reliable data sources as well as terms of use for each source. Data, metadata, and information about each search are retained and can be used for subsequent purposes, such as subsequent searches or other downstream activities.

21 Claims, 3 Drawing Sheets

(56) References Cited

U.S. PATENT DOCUMENTS

| | | |
|---|---|---|
| 2007/0288256 A1 | 12/2007 | Speier |
| 2008/0306933 A1 | 12/2008 | Valliani et al. |
| 2009/0119268 A1* | 5/2009 | Bandaru et al. .................. 707/3 |
| 2009/0254572 A1 | 10/2009 | Redlich et al. |
| 2012/0016857 A1 | 1/2012 | Gross et al. |
| 2012/0259833 A1* | 10/2012 | Paduroiu ....................... 707/709 |
| 2013/0091117 A1* | 4/2013 | Minh .......................... 707/709 |

OTHER PUBLICATIONS

International Preliminary Report on Patentability dated Sep. 25, 2014, corresponding with PCT/US2013/063737, 9 pages.
Office Action dated Apr. 20, 2015 for corresponding Taiwanese patent application No. 102136326 with English Summary, pp. 15.
Office Action dated Nov. 27, 2015 for corresponding Taiwanese patent application No. 102136326 with English Summary, pp. 12.

* cited by examiner

SYSTEM AND METHOD FOR RECURSIVELY TRAVERSING THE INTERNET AND OTHER SOURCES TO IDENTIFY, GATHER, CURATE, ADJUDICATE, AND QUALIFY BUSINESS IDENTITY AND RELATED DATA

This application claims priority from and the benefit of U.S. provisional patent application Ser. No. 61/711,673, filed on Oct. 9, 2012, which is incorporated herein by reference, in its entirety, for all purposes.

BACKGROUND OF THE DISCLOSURE

1. Field of the Disclosure

The present disclosure relates to the creation of a recursive and flexible capability to discover, identify, gather, curate, adjudicate, and qualify business entity identity and related data using one or multiple sources.

2. Description of the Related Art

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Efficient data access, via searching, matching, and other resolution capabilities, is important for discovering and adjudicating identity and related information regarding businesses and other types of entities. Crucial to this objective is an ability to enable efficient access, retrieval, and correlation of information from one or more data sources. In addition it is critical to have the ability to assess and qualify the process by and sources from which such data is accessed as well as the data itself. This includes analysis of the data and sources from which actionable feedback can be generated and then made available to be used to make decisions regarding the process, the data, metadata regarding the discovered data, sources from which data was discovered, metadata regarding those sources, and the actionable feedback from the entire process.

There are discovery products and capabilities available in the current market that ingest an inquiry regarding an entity or group of entities via batch or transactional capabilities, for example, as it is entered by a user by different methods such as (a) a person that has entered data into an inquiry field by typing or "scraping" data from other sources, (b) a machine that generates the inquiry value, or (c) a system which interacts directly with another system and then interrogates websites or other data sources for entries that contain the inquiry attributes or inferred information regarding those attributes. In other cases, in the traditional web-discovery approaches, technology can crawl for data, which can either be free-form or of fixed ontology (or logical structure).

These current discovery products and capabilities generally are limited in a number of dimensions, including the manner in which the inquiry data is analyzed and disambiguated to define attributes that can be used to identify data from existing data sources, the manner in which such data sources are accessed, the manner in which data from accessed sources are used to initiate or support subsequent resolution inquiries, the information that is provided regarding the resolution process and characteristics of the accessed data such as quality, completeness, and latency, and the manner in which such information can be used as part of a stewardship process that includes discovery, qualification, adjudication, and curation, and compliance with terms of use and prevailing constraints.

These current discovery products and capabilities generally provide data directly to the end-user and system that issued the inquiry without storing information regarding success of the resolution process and its results for subsequent use. In addition these current discovery products and capabilities generally do not maintain metadata regarding the discovered data and data sources. Further, these current discovery products and capabilities do not use data and metadata accessed from one search as input to another search through a recursive learning process.

These current discovery products and capabilities have limited ability to automatically use the experiential learning regarding the veracity, provenance, and content of data and data sources of each experience, in order to form opinions that influence the likelihood of accessing and using those sources and their data in the future, or changes in the operant characteristics or qualitative aspects of those sources.

SUMMARY OF THE DISCLOSURE

The disclosed embodiment includes a process that is executed recursively in order to utilize results of one inquiry or set of objective attributes to initiate subsequent inquiries from the same data source as well as from other data sources, such that discovered data becomes inquiry data.

In the disclosed embodiment, experiential information regarding the veracity, provenance, and content of data and data sources of each experience is generated, curated, synthesized, and automatically subsumed to form opinions that influence the likelihood of accessing and using those sources and their data in the future.

In the disclosed embodiment, feedback regarding each experience is generated to enable an end-user, which can be a person, computer system, or other recipient or downstream process, to utilize business rules to drive the use and consumption of the process and end results to make decisions regarding the use of information in a consistent and repeatable manner, and in a scalable way if those same business rules are applied to different technologies, products, or solutions.

In the disclosed embodiment, processes can be performed without limitations of context, geographic location, language, or writing-system. This outcome is accomplished through a language agnostic capability that enables the use of any kind or number of standard web language tags and is not restricted by coding and logic that is specific to context, geographic location, languages, or writing systems.

The present document discloses an automated system and method for executing an automated recursive discovery process that does not require human intervention to identify, qualify, curate, adjudicate, and synthesize data, such as, for example, business identity or behavior, and related metadata information which is accessed from multiple sources.

The disclosure is directed to a system for searching for data relevant to an inquiry, comprising: a storage device containing a list of seed sources that specify initial search targets for said inquiry; a search engine that searches the initial search targets for data relevant to the inquiry based on data and metadata identified from the initial search targets and prior additional search targets; the storage device storing, from the initial and additional search targets, the data and metadata; and wherein the search engine searches said additional search targets for at least additional data relevant to the inquiry, and data and metadata specifying further additional search targets.

The search engine searches the additional search targets, and further search targets are found. Data and any related metadata specifying the further search targets are stored in the storage device for use by the search engine in accessing the further targets. Additional search targets are searched, and further search targets are found, until the searching of additional search targets produces no further search targets to search or until acceptable adjudication rules or exception rules have been met.

The further search targets are found through a recursive and exhaustive process whereby search targets are identified based on data and metadata from results of prior searches and search targets.

The search engine is configured to search web sites or other sources, and the list of seed sources is a list of web sites or other sources.

The processor is configured to cleanse data acquired from each search target. Cleansing can include at least one of parsing the data, removing erroneous or inappropriate values for the data, and removing predetermined tokens from the data.

The processor can be configured to perform data validation on given data by comparing the given data from search targets that have been searched, and selecting as valid the data from a source considered to be most reliable and usable, based on a set of precedence and usage rules. The processor can also be configured to curate, adjudicate, synthesize, and cluster related data from different search targets to form clustered data records. The processor can generate a composite data record from the clustered data records.

The disclosure is also directed to a method for searching for data relevant to an inquiry, comprising examining data found in a set of initial search targets; storing in a storage device, from the initial search targets, (a) at least one of data and metadata relevant to the inquiry, and (b) at least one of data and metadata that specifies additional search targets to be searched; searching the additional search targets for (a) at least one of the data and metadata relevant to the inquiry, and (c) at least one of data and metadata specifying further search targets to be searched; and storing in the storage device, from the further search targets (a) at least one of data and metadata relevant to the inquiry and (c) at least one of data and metadata specifying the further search targets.

When additional search targets are searched, if further targets are found, the method further comprises using (c) at least one of the data and metadata specifying the further search targets to access the further targets; and storing in the storage device, from the further search targets (a) at least one of data and metadata relevant to the inquiry, and (d) at least one of data and metadata specifying other search targets to be searched.

The method is terminated when the searching of further search targets produces no additional search targets to search.

In accordance with the method, the search engine can be configured to search web sites or other sources. The list of seed sources is a list of web sites or other sources.

The data acquired from a search target can be cleansed. The cleansing of data can be performed by steps including parsing the data, removing erroneous values for the data, and removing predetermined tokens from the data.

Data validation can be performed by comparing the data from various sources that have been searched, and selecting as valid the data from a source considered to be most reliable, based on a set of precedence rules.

The method can further comprise curating, adjudicating, synthesizing, and clustering related data from different sources to form clustered data records. Composite multi-source data records can be generated from sets of clustered data records. The method can further comprise, for example, but not by way of limitation, performing at least one selected from the group consisting of writing to a database, archiving in a database, generating a report and publishing results that were found by searching for data relevant to the inquiry.

The method can further comprise applying an analytical method of at least one selected from the group consisting of rules, algorithms, heuristics, and other analytic functions to make decisions with respect to the data, and a decision as to whether to continue or to terminate the method.

The disclosure is also directed to a computer readable non-transitory storage medium storing instructions of a computer program, which when executed by a computer system, results in performance of steps of examining data found in a set of initial search targets; storing in a storage device, from the initial search targets, (a) at least one of data and metadata relevant to the inquiry, and (b) at least one of data and metadata that specifies additional search targets to be searched; searching the additional search targets for (a) at least one of data and metadata relevant to the inquiry, and (c) at least one of data and metadata specifying further search targets to be searched; and storing in the storage device, from the further search targets (a) at least one of data and metadata relevant to the inquiry and (c) data specifying the further search targets.

The computer readable non-transitory storage medium can store additional instructions of a computer program, which when executed by the computer system, results in performance of steps of using (c) at least one of the data and metadata specifying the further search targets to access the further targets; and storing in the storage device, from the further search targets (a) at least one of data and metadata relevant to the inquiry, and (d) at least one of data and metadata specifying other search targets to be searched.

The computer readable non-transitory storage medium can store additional instructions of a computer program, which when executed by the computer system, when additional search targets are searched, and data specifying further search targets are found, for repeatedly executing the method until the searching of further search targets produces no search targets to search, or acceptable adjudication rules or exception rules have been met.

BRIEF DESCRIPTION OF THE DRAWINGS

A component or a feature that is common to more than one drawing is indicated with the same reference number in each of the drawings.

DETAILED DESCRIPTION OF THE EMBODIMENT

Definitions

Recursion defines a multi-step language-agnostic or multi-lingual discovery process whereby the output of previous steps become input to subsequent steps, meaning end-to-end behavior and results are not predictable at the onset but rather determined by discovered data, execution process, and intermediate results. This activity may include the use of input data in native state as retrieved from a predecessor step or as may be modified as a result of cleansing or other data transformations.

Resolution defines a process to identify data in accordance with an inquiry value. An inquiry can be resolved using different approaches, for example, through match, search or lookup capabilities, against various forms of reference.

Discovery is the process to identify and qualify information that is retrieved from data sources in accordance with an inquiry Flexibility indicates that processes can be automatically adapted based on usage and information about how processes were executed or other metadata, and easily modified in order to support different objectives.

Non-deterministic implies that the flexible approach is defined dynamically based on information regarding data, metadata, and previous processes that accessed that data and metadata, and cannot be algebraically estimated in advance relative to execution time or outcome.

Experiential learning relates to the use of information regarding the veracity, provenance, and content of data, data sources, and metadata regarding data and data sources of each experience for a range of reasons, for example, in order to form opinions that influence the likelihood of accessing and using those sources and their data in the future.

Feedback is information about the discovery experience and process, as well as about the result of that process. This feedback can be used to enable an end-user, which can be a person, a computer system, or other recipient, to utilize business rules to drive the use and consumption of the process and end results to make decisions. Feedback that reflects inferred quality is data that can be used by the end-user to determine the degree to which the results meet that end-user's quality-based criteria.

Alternative indicia are data which may be used as part of a resolution process or information that is retrieved as a result of that process which relate to the identity or other aspects of their subject. Indicia may include data which may be previously known or discovered during the execution of the discovery process, which may then be used for subsequent reasons, such as, for example, to curate, adjudicate, and synthesize in order to enable future discovery experiences.

Curation and adjudication processes qualitatively assess each discovery experience and results, and determine subsequent actions based on those assessments. This process includes retaining and assessing the provenance and veracity of each source that is accessed during the execution of the method in accordance with the described embodiment, in order to provide information that will be used in subsequent executions as to the qualitative benefit of each source in total and each type of data accessible from that source. Curating generally refers to the organization, storing, and maintenance of data. Adjudicating generally refers to making a determination as to the quality of data and how it can be used most effectively.

The term module is used herein to denote a functional operation that may be embodied either as a stand-alone component or as an integrated configuration of a plurality of sub-ordinate components. Thus, the program module, as described below, can be implemented as a single module or as a plurality of modules that operate in cooperation with one another.

A search engine is an example of a resolution capability, and is generally a combination of hardware, and software controlling the operation of the hardware, for purposes of finding and collecting data relevant to or discovered as a result of an inquiry.

The term search is used herein to indicate any approach to identity information that may be of interest.

The term application specific as used in this disclosure means that different sets of business rules and processes that are used in the execution of the method and in the implementation of the system can be defined to meet the specific objectives disclosed herein.

Publishable means that the end-results of the process executed by this invention can be available for subsequent use, for example, written to a data repository, used as input to a system or application, or written to a report.

A data storage device can be any device used in computer technology to store data, usually on a non-transitory basis, as further described herein. Different portions of a data storage device, used to store different kinds of data, may be on the same physical device or on a different physical device.

Figure 1:
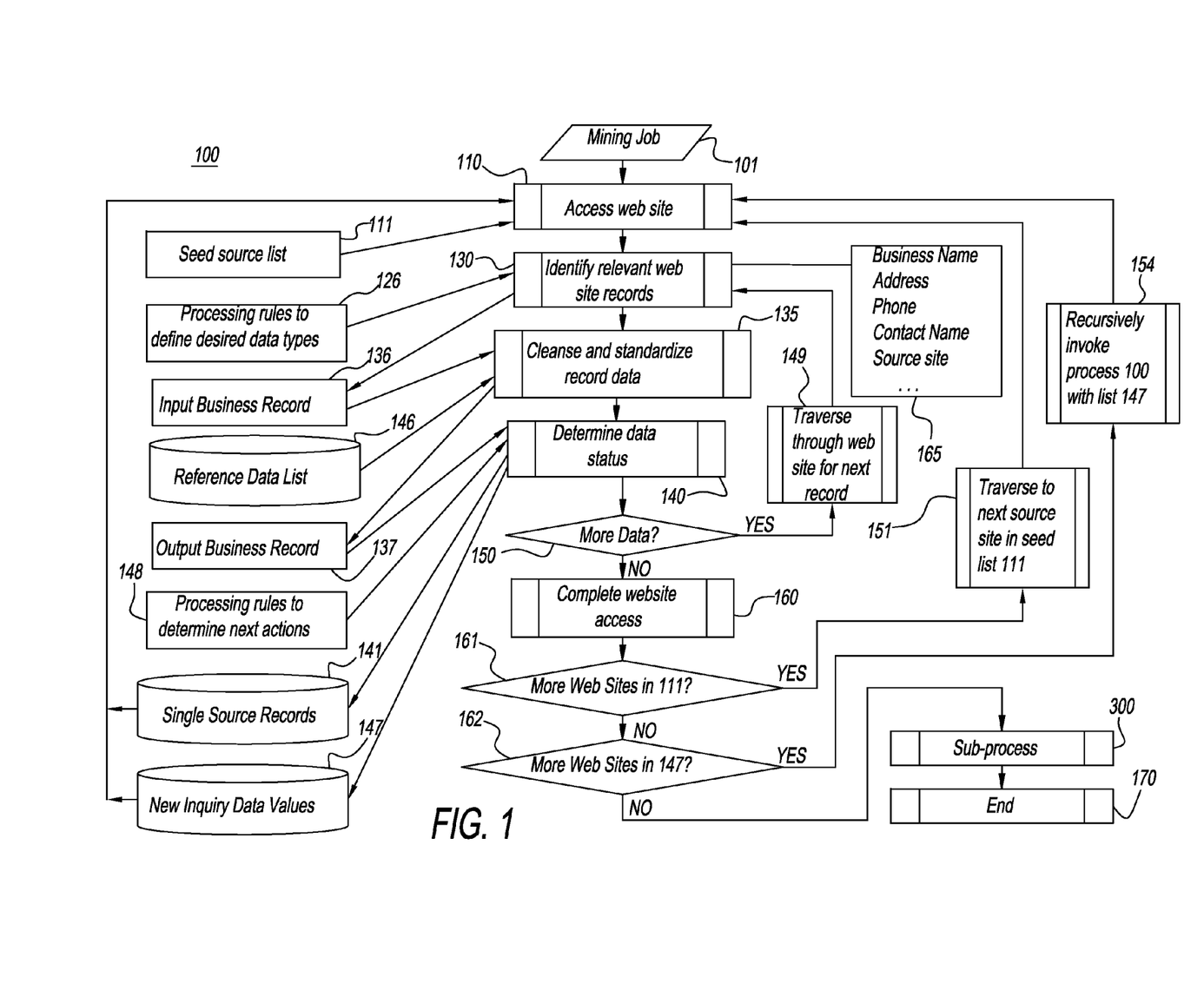
FIG. 1 is a block diagram of a method for searching for and gathering data from an initial set of sources.
Figure 2:
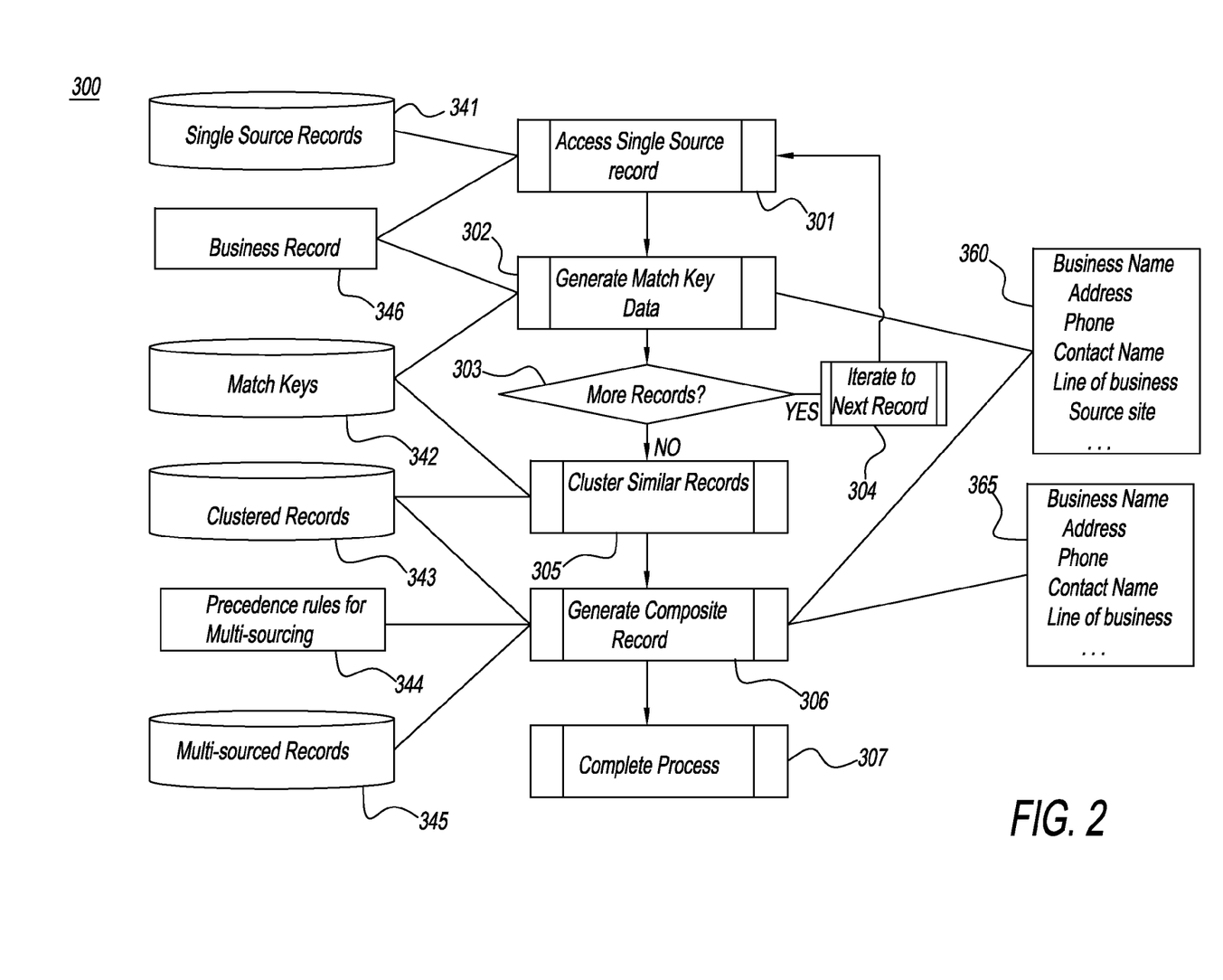
FIG. 2 is a block diagram of a method for reviewing and consolidating records.

FIG. 1 and FIG. 2 are functional block diagrams that describe an exemplary process for gathering and transforming data from the world wide web (also known as the Internet) into publishable business data using a recursive process that includes accessing known and discovered websites, and repeating the process multiple times to find additional web sites using data that is previously known or discovered through the process, to identify, qualify, adjudicate, curate, synthesize, and retain data in one or more data repositories, documented in a manner to allow generation of data in reports, accessed or displayed using other visual or other media, or to facilitate the integration of discovered data within software applications for subsequent use. This disclosed embodiment is an apparatus, including the components of a search engine and associated processes for handling business entity data, but can be used for other types of data, such as, for example, medical data. The data repositories can include data for both new entities as well as modifications to entities that were previously in a data repository, which is a part of the disclosed embodiment.

In FIG. 1 a part of the process, 100, which is principally a data discovery part of the process, searches and gathers data from an initial finite set of sources that are identified by web-site addresses or uniform resource locators (URLs), including both a pre-defined list of sources to use as well as other sources identified during the execution of process 100. In this embodiment, once all initial web addresses are searched, process 100 will check for the presence of the other newly discovered web addresses, but the order in which web addresses are searched can be different in a different embodiment. This discovery process is of significance to the non-deterministic approach of the disclosed embodiment, in that, the process will continue to access new websites and collect data until no further information that is of interest, based on predefined criteria, is discoverable or collectable. For each new set of discovered web addresses, process 100, leveraging a set of rules, algorithms, heuristics, or other analytical methods, makes a decision as to whether it will invoke itself to continue the next cycle of discovery and collection or terminate the set of activities. This self-invocation is of significance to the recursive nature of the disclosed embodiment and is one defining characteristic that is distinguishable from traditional web-mining and searching.

An example of an algorithm that may be used is the generation of an acronym as an alternative value for a business name by isolating and then consolidating first letters of each separate word. For example, following this algorithm, International Business Machines would become IBM, or with a minor variation in the algorithm, International Business Machines Corporation would also become IBM.

An example of a heuristic that may be used is to identify a geographic demographic segment based on industry types. For example, multiple technology firms in Mountain View, Calif. may represent a propensity for a high percentage of employees under forty years old and a propensity for a high percentage of individuals with secondary degrees or PhDs.

At step 101 the receipt of a discovery job initiates process 100. At step 110, a web site is accessed based on a seed source list 111. Each record in seed source list 111 includes a website address (URL). This could include any URL which follows standard formatting rules such as but not limited to those preceded by "www".

Process 100 progresses to step 130, where relevant web site records are identified using processing rules list 126, which define desired data types, as an input value. Processing rules list 126 define the data elements being searched for in the seed source list 111.

The table below provides some examples of data element definition rules in processing rules list 126.

| Data element | Rule |
| --- | --- |
| Phone number | All numeric string |
| Phone number | 10 bytes long |
| Phone number | Hyphen found after $3^{rd}$ and $6^{th}$ digit |
| Address | Text string containing keywords "street", "avenue", "route", "road", or "lane", etc. |
| Address | Cannot contain only numerics |
| Postal Code | 5 or 9 digits in length |
| Postal Code | All numeric string |

In step 130, using the rules defined in processing rules list 126, the data found on the source site identified by the URL in seed source list 111, which is provided through step 110, is systemically read. For each piece of data read in from the website, a determination is made at step 130 as to whether the data conforms to any of the rules defined in processing rules list 126. If a piece of data conforms to the rules for a given element, it is stored in an input business record 136 in an appropriate element defined by a data element list 165. For example, the string value of 999-999-9999 meets the criteria for a United States phone number based on the sample rules detailed above. This value would be written to a telephone number field in input business record 136.

Through the use of application specific rules (for example, processing rules list 126), process 100 is able to maintain a flexible and non-deterministic implementation that meets the needs of varying end uses of the process. By leveraging these rules, process 100 is able to discover a particular type of entity (for example, business entities) that satisfies a set of characteristics which can be defined in a manner specific to each individual execution of process 100.

Input business record 136 is a data construct used to store the data found and collected in step 130. Each record consists of data elements defined in data element list 165. Data element list 165 is essentially a container for the major components of an entity, such as in the case of a business record the name, address and telephone number.

In step 135, each element of the record data obtained is parsed into its subcomponents, cleansed, normalized and standardized, using approaches that are well known in the art of searching, using input business record 136 as an input value. Using reference data in a reference data list 146, the values in each of the data elements in input business record 136 are parsed. As each element is parsed, a set of components specific to an entity, such as a business, is identified based on data element list 165. These components provide insight regarding characteristics of the business; as an example for a business entity this may include corporate structure and physical location (address). For example, address components are standardized based on reference data in reference data list 146. Data is also cleansed of undesired values, for example blanks, excessive punctuation, or other characters or sets of characters commonly referred to as "noise"; the resulting element values are application useable business information. The modified data is written out to output business record 137. Output business record 137 is the same structure as input business record 136 as defined by data element list 165.

Below is a sample of one form of reference data that may be found, but is not inclusive of all types of reference data possible, in list 146.

| Element | Token | Action | Output Value | Input Value | Standardized Output |
| --- | --- | --- | --- | --- | --- |
| Business Name | * | Remove from value | | | |
| Business Name | & | Remove from value | | | |
| Address | "main" | | | "Main" | |
| Address | "strt" | | | "St." | |
| Contact Name | "Mr." | Remove from value | | | |
| Address | | | | "Anytown, NJ" | "Anytown, NJ 10000" |
| Address | | | | 1600 Pennsylvania Ave., Washington, DC | 1600 Pennsylvania Ave., Washington, D.C. 20500-0003 |

A sample input business record in input business record list 136 is:

| Business Name | Address | Phone | Contact Name | Line of Business | Source site |
| --- | --- | --- | --- | --- | --- |
| ABC *&Company | 123 main Strt, Anytown, NJ | 1(999)1234567 | Mr. John Smith | !Manufacturing | www.CompanyListing.com |

An output business record in output business record list 137, with the data parsed, cleansed, normalized and standardized is then:

| Business Name | Address | Phone | Contact Name | Line of Business | Source site |
|---|---|---|---|---|---|
| ABC Company | 123 Main St., Anytown, NJ 10000 | 19991234567 | John Smith | Manufacturing | www.CompanyListing.com |

Reference data list 146 is a set of reference data used in step 135. Reference data list 146 contains string tokens and geographical reference data. In the parsing stage of step 135, these tokens are used to identify key data elements in the data collected. An example of a token is "Street". The presence of "Street" would denote the data element is an address.

Tokens in reference data list 146 also contain undesired values. The cleansing process searches for and removes such tokens from the values in data element list 165. Examples of undesired tokens are profane words.

The geographical reference data in reference data list 146 is used in a standardization operation of step 135, for example, to modify address data to conform to a local postal standard. Standardized data creates a more consistent representation of address data.

In the example below, the original non-standardized value is missing a postal code and has an incomplete street address. The standardization process in step 135 compares the original address to the reference data stored in reference data list 146 and outputs a complete address output business record list 137.

|  | Street | City | Postal Code | State |
|---|---|---|---|---|
| Non-standardized | 1600 Pennsylvania Ave. | Washington |  | DC |
| Standardized | 1600 Pennsylvania Avenue NW | Washington | 20500-0003 | DC |

In step 140 (after the data in input business record 136 is cleansed, standardized, and written out to output business record 137 as described above), status regarding output business record 137 is determined, which defines subsequent actions. Output business record 137 and a next actions processing rules list 148 are inputs used in step 140.

Processing rules list 148 includes (A) a set of processing rules used to determine the next set of actions to perform on output business record 137 as well as (B) the next logical step to take in process 100. For example, one type of rule in next actions processing rules list 148 is a set of record validation rules. Processing rules list 148 may also include algorithms, heuristics, or other analytical methods, as described above.

The actual validation rules and criteria are not limited but are specific to each implementation of a particular embodiment. An example of a possible rule is: "Validation rule 1: Business name, street, city, postal code, and phone number must be populated."

If output business record 137 passes the set of validation rules of next actions processing rules list 148, it is written out to single source records list 141.

Single source records list 141 stores all validated instances of output business record 137. Single source implies that a separate data record is retained for each accessed and selected record from the URL sources. At this point in process 100, each output business record 137 is a single source record that is copied to a new inquiry data values list 147. Thus, each output business record in output business records list 137 and new inquiry data values in new inquiry data values list 147 contain data from only one website. In single source records list 141, there can be multiple records representing the same business, but the sources of the data can be different. An exemplary view of single source records list 141 is as follows:

| Record No. | Entity Name | Address | City | Postal Code | Phone Number | Line of business | Source site |
|---|---|---|---|---|---|---|---|
| 1 | ABC Company | 123 Main Street | Anytown | 10000 | 999-888-1111 | Bakery | abccompany.com |
| 2 | Abc Company |  | Anytown |  | 999-888-1000 | Bakery/bread | Yellowpages.com |
| 3 | ABC Company | Main Street |  | 10000 |  | Bakery | AnytownBiz.com |
| 4 | MyCorp | 222 First Avenue | New York City | 21212 | 614-111-1010 |  | Yellowpages.com |
| 5 | John Doe, Inc. | Suite A, 100 4th Street | Washington | 11111 | 888-555-0000 | Legal Services | JohnDoe.com |

In the example above, record 1 has business information from only one website, www.companylisting.com. While record 2 may refer to the same business, its information was collected from www.abccompany.com. Each record has only a single website as the source for its data.

During the course of executing process 100 through steps 130, 135, and 140, new source URLs related to a business record may be found; these are written out to new inquiry data values list 147. Only URLs not already accessed are written to new inquiry data values list 147. New inquiry data values list 147 is identical in structure to seed source list 111 and contains sites to further examine in process 100.

Example

Source site www.companylisting.com is an original site in seed source list 111.
In the course of reading data on www.companylisting.com, business "ABC Company" is found along with its associated website www.ABC-Company.com.
www.ABC-Company.com is written out to new inquiry data values list 147.

In step 140, based on an evaluation of data retrieved and analyzed up to this point in process 100, next steps in process 100 are determined. Criteria used to determine the presence of additional data is application specific, and is determined as described in the conditions and steps below. Some examples include, but are not limited to, the presence of additional business name entries and/or links to additional websites that may have additional relevant data. These application specific conditions and criteria are stored in next actions processing rules list 148.

Processing rules list 148 consists of a set of processing rules used to determine the next set of actions to perform on record 137 as well as the next logical step to take in the process. Two exemplary types of rule in processing rules list 148 are a set of record validation rules or a process to evaluate website terms of use. Method 140 validates the data in record 137 using these rules to confirm the presence of a complete business record. The number of validation rules and criteria are application specific.

Processing rules list 148 may also have rules to keep process 100 from continuing without any termination. Process 100 may be terminated, for example, after a fixed amount of time from the commencement of the process has elapsed, or after a given number of CPU operations have been performed.

There are multiple potential conditions which would determine subsequent actions. In this example two conditions are described. Condition 1 relates to a situation where there may be more relevant data to be accessed from the initial URL or additional URL's discovered during the execution of process 100. Condition 2 relates to a situation where there is no more relevant data to be found on the initial or additional URLs.

For Condition 1, at step 150, there is additional data to be read from the current website. Process 100 loops back to step 130 by way of step 149, where the web site being examined is traversed for the next record. This loop will repeat until there is no additional data to be read in from the website currently being examined.

Continuing Condition 1, this loop via step 149 to step 130 is one component of the open, thorough and repetitive nature of the disclosed embodiment. This repetition allows process 100 to be non-deterministic in nature, so that no prior knowledge of the website being examined or of the number of business entities present before web-discovery is required.

Continuing Condition 1, at each execution of the loop via step 149 to step 130, single source records list 141 and new inquiry data values list 147 are maintained in data storage mediums that retain all information collected during each preceding execution of the loop via step 149 to step 130. Single source records list 141 has additional business records appended to it during the discovery phase as described above, with respect to FIG. 1. New inquiry data values list 147 has additional URL's appended to it during the data discovery phase. The data in single source records list 141 and new inquiry data values list 147 are used as input to the loop of 149 to step 130, until the entire process 100 is completed and no further data can be read from the website, as described in condition 2 below.

For Condition 2, process 100 progresses from step 140 to step 150. If a determination is made at step 150 that all data has been read from the website currently being examined, process 100 then progresses from step 150 to step 160.

Continuing Condition 2, in step 160, access to the web site currently being examined is completed, and the connection to the website currently being examined is closed. Upon completion of step 160, process 100 progresses to step 161, where a determination is made as to whether all web sites in seed source 111 have been examined. If all web sites in seed source list 111 have not been examined, process 100 progresses to step 151, wherein a connection is opened to the next web site in seed source list 111. Process 100 progresses back to step 110.

At this point there are multiple potential sub-conditions. In this example, two potential sub-conditions (referred to below as Condition 2A and Condition 2B) are described which determine subsequent actions. The next progression of steps is determined based on one of these conditions.

For Condition 2A, if all original source sites in seed source list 111 have been accessed, process 100 progresses from step 161 to step 162. In step 162, initially, a determination is made as to whether any new inquiry data (for example, URLs) were added to new inquiry data values list 147. Process 100 progresses to step 154, if new inquiry data were added to new inquiry data values list 147, which invokes process 100 again through step 110 to access another web site using data in new inquiry data values list 147 as an input. New inquiry data values list 147 essentially assumes the role that was previously the role of seed source list 111, in this invocation of step 110. This loop back to step 110 is another component of the repetitive nature of the disclosed embodiment. Repeating this loop allows the process to be non-deterministic in nature so that prior knowledge of the website or number of business entities present before web-discovery is not required. A search loop is executed, single source records list 141 and new inquiry data values list 147 are maintained on portions of data storage mediums that retain all information collected during each progression through the loop via step 154. Single source records list 141 has additional business records appended to it during this discovery phase as described above. New inquiry data values list 147 has additional URL's appended to it during this discovery phase as described above. The data continues to persist in single source records list 141 and new inquiry data values list 147. The data in single source records list 141 and new inquiry data values 147 are used as input to process 100 at step 110, until, at step 162, a determination is made that no new inquiry data values have been added to new inquiry data values list 147. This is continued recursively and exhaustively until there are no further URL's to be processed, as described by condition 2B below.

For Condition 2B, all original source sites in seed source list 111 have been examined and all new inquiry data, if any, from new inquiry data values list 147 has also been examined. Process 100 progresses to sub-process 300.

Sub-process 300 is described below, with reference to FIG. 2. After completion of sub-process 300, process 100 progresses to step 170, where process 100 ends.

FIG. 2 is a block diagram of sub-process 300, which details a method for analyzing and evaluating the data discovered during the data discovery portion of process 100 described above (FIG. 1), to transform it into publishable data. Sub-process 300 starts with a set of possibly related, but as yet non-correlated, data records as discovered in process 100. Sub-process 300 creates unique keys for each piece of data and then determines correlations between the non-correlated data elements. Through a rules-based review process, sub-process 300 establishes relationships between the data elements, and groups the entities into clusters based on pre-defined criteria. These clusters are then synthesized into a series of unique single entities, each of which represents the "best view" (as determined by application specific business rules) of that cluster's element values.

In step 301, sub-process 300 is initiated with one record from a single source record list 341 being read as an input value. Single source record list 341 is the database of single-sourced records that were collected upon execution of process 100. The records therein have the form of records in input business records 136 (FIG. 1), in for example, the following form:

| Business Name | Address | City | Postal Code | Phone Number | Line of business | Source site |
|---|---|---|---|---|---|---|
| ABC Company | 123 Main Street | Anytown | 10000 | 999-888-1111 | Bakery | abccompany.com |
| Abc Company | | Anytown | | 999-888-1000 | Bakery/bread | Yellowpages.com |
| ABC Company | Main Street | | 10000 | | Bakery | AnytownBiz.com |
| MyCorp | 222 First Avenue | New York City | 21212 | 614-111-1010 | | Yellowpages.com |
| John Doe, Inc. | Suite A, 100 4$^{th}$ Street | Washington | 11111 | 888-555-0000 | Legal Services | JohnDoe.com |

In step 302, data elements 360, in the form of data element list 165 (FIG. 2), from a business record in a business records list 346 (a list of single business records), are read. A match key is generated for each field in a data element 360 in business records list 346. A match key is an identifier that uniquely identifies a data element's contextual value. For example, "ABC Company" and "Abc Company" are not the same byte-for-byte strings. However, contextually, they are the same name. Such evaluation might also be made by examination of synonyms, alternative name styles, or other allowable transformations. The match key generated for these two values could be the same. The following table presents examples of records with the same match key and records with unique match keys as indicated by the column "Name Match Key".

| Business Name | Name Match Key |
|---|---|
| ABC Company | X |
| Abc Company | X |
| ABC Company | X |
| MyCorp | A |
| John Doe, Inc. | B |

In step 302, the match keys, along with the original data in business records list 346, are written out to match key list 342.

In step 303, a determination is made as to whether there are any additional records in business records list 346. If there are additional records, a loop is executed via step 304, and a match key is generated for the next record. In executing the loop via step 304, the next record to be read is read in step 301. When all records in single source record list 341 have been read and match keys generated for them, sub-process 300 exits from the loop at step 303, and progresses to step 305.

In step 305, with match key list 342 as an input, matching records are grouped into clusters based on their match keys. Each grouping is assigned a cluster identification, referred to as a cluster ID. Each record assigned a cluster ID is written out to clustered records list 343 along with its cluster ID.

| Business Name | Match Key | Cluster ID |
|---|---|---|
| ABC Company | X | Y |
| Abc Company | X | Y |

-continued

| Business Name | Match Key | Cluster ID |
|---|---|---|
| John Doe, Inc | A | <no cluster id> |
| MyCorp | B | <no cluster id> |

In the examples above, "ABC Company" and "Abc Company" have the same match key so they are both assigned the same cluster ID. Neither "John Doe, Inc" nor "MyCorp" match to any other records. They are therefore not assigned a cluster ID.

Clustered records list 343 contains the clusters generated at step 305. Each record in clustered records list 343 contains a single business record and the cluster ID associated with it.

Example of two clusters in clustered records list 343:

| Business Name | Address | City | Postal Code | Phone Number | Line of business | Source Site | Cluster Id |
|---|---|---|---|---|---|---|---|
| ABC Company | 123 Main Street | Anytown | 10000 | 999-888-1111 | Bakery | abccompany.com | Y |
| Abc Company | | Anytown | | 999-888-1000 | Bakery/bread | Yellowpages.com | Y |
| ABC Company | Main Street | | 10000 | | Bakery | AnytownBiz.com | Y |
| SomeCorp | 222 First Avenue | Washington | 21212 | 888-555-0000 | | Yellowpages.com | Z |
| SomeCORP | Suite A, 100 4$^{th}$ Street | Washington | | 888-555-0000 | Legal Services | LegalSvcLists.com | Z |

Sub-process 300 next progresses from step 305 to step 306, where clustered records list 343 and precedence rules in a precedence rules list 344 are received as inputs.

In step 306, a clustered set of records is amalgamated into a single composite record by leveraging the precedence rules in precedence rules list 344. This amalgamation process selects the most desired value for each data element collected. This amalgamation process of step 306 is made possible based on source and entity discoveries made in the data discovery portion (FIG. 1) of process 100. As each entity is discovered, the source site information, including metadata about that site, is captured. With each new set of metadata found, a new piece of information is discovered about the sources of data available. This metadata, in conjunction with the precedence rules in precedence rules list 344, is used to make a judgment about the quality of the data collected from the various sources and to determine the best view of the data in a clustered record.

An example of common metadata about source sites is HTML tags used to describe the site to search engines. Examples of these HTML tags to identify the source of a record may be "business trade directory", "yellow pages", or "online phonebook".

Additionally, the rules in precedence rules list 344 specify the criteria regarding which sites can be used to corroborate the veracity of the data discovered. Based on the specific business application, based on precedence rules list 344, some sites may be of sufficient trustworthiness to confirm the veracity of another site. For example, a phone company's website would be considered an authoritative source for phone numbers and could confirm the veracity of a phone number found on a non-telecom site.

Below is one example of how the precedence rules in precedence rules list 344 can be used.

Example

Rule 1

A known telecom website will be considered the primary authority for phone numbers.

| Business Name | Address | City | Postal Code | Phone Number | Line of business | Source site |
|---|---|---|---|---|---|---|
| ABC Company | 123Main Street | Anytown | 10000 | 999-888-1111 | Bakery | searchengine.com |
| Abc Company | | Anytown | | 999-888-1000 | Bakery/bread | Yellowpages.com |

Based on "Rule 1" and the sample records above, the phone number from yellowpages.com would be considered the most reliable value. The resulting composite, record can be:

| Business Name | Address | City | Postal Code | Phone Number | Line of business | Source site |
|---|---|---|---|---|---|---|
| ABC Company | 123 Main Street | Anytown | 10000 | 999-888-1000 | Bakery | Yellowpages.com |

In the absence of any precedence rules for a given element, a default selection can be utilized wherein the amalgamation process of step 306 selects the value from the first record in the cluster. The values are written to a composite record data element 365. It is noted that there is not necessarily a difference in how records are laid out in data elements 360 and in composite record data elements 365. Composite record data elements 365 are written out to a multi-sourced records list 345.

Multi-sourced records list 345 holds all multi-sourced records. Multi-sourced records are records where the business data was found on at least two source sites. Once all clusters are read in and processed at step 306, sub-process 300 moves to step 307, where sub-process 300 is completed and control is returned to process 100. After step 170 of process 100, the results provided by the disclosed embodiment can be stored, written and/or published. As examples, the results may be archived in a database, written to a database, used to generate a report, or published to a calling application which called process 100. The results can be used for any or all of these or other purposes, and the method of utilization of the results is application specific and independent of the intended future usage of the results generated by the disclosed embodiment.

Figure 3:
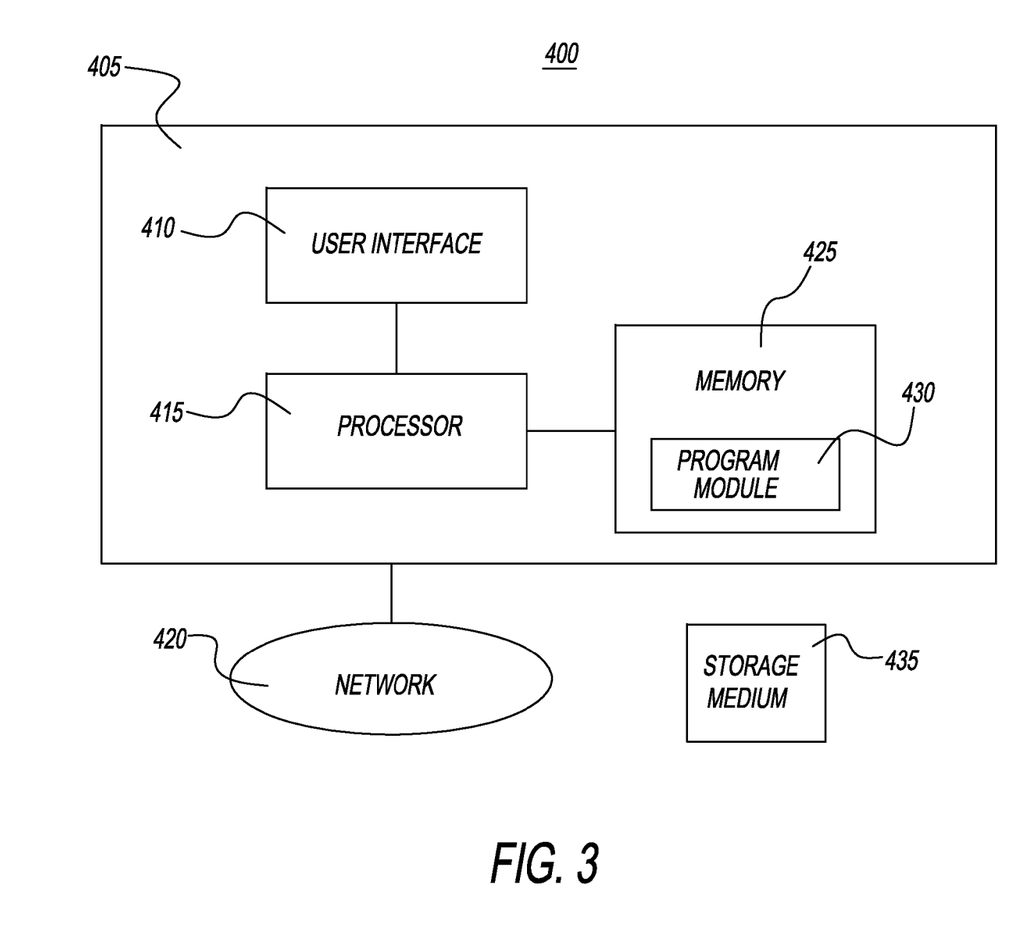
FIG. 3 is an illustration of a computer system used to implement the disclosed embodiment.

FIG. 3 is a block diagram of a system 400, for employment of the present invention. System 400 includes a computer 405 coupled to a network 420, e.g., the Internet.

Computer 405 includes a user interface 410, a processor 415, and a memory 425. Computer 405 may be implemented on a general-purpose microcomputer. Although computer 405 is represented herein as a standalone device, it is not limited to such, but instead can be coupled to other devices (not shown) via network 420.

Processor 415 is configured of logic circuitry that responds to and executes instructions.

Memory 425 stores data and instructions for controlling the operation of processor 415. Memory 425 may be implemented in a random access memory (RAM), a hard drive, a read only memory (ROM), or a combination thereof. One of the components of memory 425 is a program module 430.

Program module 430 contains instructions for controlling processor 415 to execute the methods described herein. For example, as a result of execution of program module 430, processor 415 (a) examines data found in a set of initial search targets; (b) stores in a data storage device, from the initial search targets, data relevant to the inquiry, and data that specifies additional search targets to be searched; (c) searches the additional search targets for data relevant to the inquiry, and data specifying further search targets to be searched; and (d) stores in the data storage device, from the further search targets, data relevant to the inquiry and data specifying the further search targets.

The term "module" is used herein to denote a functional operation that may be embodied either as a stand-alone component or as an integrated configuration of a plurality of sub-ordinate components. Thus, program module 430 may be implemented as a single module or as a plurality of modules that operate in cooperation with one another. Moreover, although program module 430 is described herein as being installed in memory 425, and therefore being implemented in software, it could be implemented in any of hardware (e.g., electronic circuitry), firmware, software, or a combination thereof.

User interface 410 includes an input device, such as a keyboard or speech recognition subsystem, for enabling a user to communicate information and command selections to processor 415. User interface 410 also includes an output device such as a display or a printer. A cursor control such as a mouse, track-ball, or joy stick, allows the user to manipulate a cursor on the display for communicating additional information and command selections to processor 415.

Processor 415 outputs, to user interface 410, a result of an execution of the methods described herein. Alternatively, processor 415 could direct the output to a remote device (not shown) via network 420.

While program module 430 is indicated as already loaded into memory 425, it may be configured on a storage medium 435 for subsequent loading into memory 425. Storage medium 435 can be any conventional storage medium that stores program module 430 thereon in tangible form. Examples of storage medium 435 include a floppy disk, a compact disk, a magnetic tape, a read only memory, an optical storage media, universal serial bus (USB) flash drive, a digital versatile disc, or a zip drive. Alternatively, storage medium 435 can be a random access memory, or other type of electronic storage, located on a remote storage system and coupled to computer 405 via network 420.

Thus, the present embodiment improves existing discovery products and capabilities, which include but are not limited to any one or to all of the following: (1) the process by which inquiries are handled prior to accessing the world wide web and other data sources, (2) the process by which the world wide web and other sources are accessed in context of the inquiries, (3) the process by which inquiry data is compared to data on the world wide web and other sources in order to identify, evaluate, curate, adjudicate, and select records that contain data that are determined to be similar to the inquiry and metadata related to those data, (4) the process by which information regarding the discovery process and sources is maintained and qualified, (5) the process by which the data and metadata from discovered sources is used to access other data sources through a recursive process, (6) the process by which resulting data can be further curated, adjudicated, and synthesized, including initially to populate as well as to update data on new or existing databases, and (7) the process by which the discovered results including both data and metadata are qualified to determine the relative similarity between the inquiry and the discovered results, including the data that was used to make this determination, which can then be provided to an inquirer or an inquiring system to determine if and how to use the results.

To fulfill these needs, there is provided a method that includes but is not limited to any one or to all of the following: (a) receiving an inquiry to initiate a discovery process for business identity and related information, (b) determining, based on the inquiry, a recursive strategy or strategies to access the world wide web and other data sources based on the specific data contained in the inquiry, (c) recursively accessing and analyzing data on the world wide web and other data sources, in accordance with the strategy, for data that is similar to the inquiry, (d) judging the accuracy of and qualifying data and related metadata, and (e) outputting the data results, feedback, and other related information regarding the process by which the data was accessed and determined to be valuable. There is also provided a system that performs the method, and a storage medium that contains instructions that control a processor to perform the method.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances.

What is claimed is:

1. A computer readable non-transitory storage medium storing instructions of a computer program, which when executed by a computer system, results in performance of steps comprising:
   a) providing a plurality of initial search targets based upon said inquiry of a plurality of seed sources;
   b) searching a first one of the plurality of initial search targets to obtain data and metadata relevant to the inquiry;
   c) repeating step (b) until all said data and metadata of the first one of the plurality of initial search targets have been collected and stored;
   d) searching a next one of the plurality of initial search targets to obtain additional data and metadata relevant to the inquiry;
   e) repeating step (d) until all said additional data and metadata of the next one of the plurality of initial search targets have been collected and stored;
   f) repeating steps (d) and (e) until all of the plurality of initial search targets have been searched and said additional data and metadata have been collected and stored;
   g) processing said data and metadata and said additional data and metadata stored in steps (c) and (e), respectively, thereby generating additional search targets;
   h) repeating steps (b) through (f) for said additional search targets; and
   i) repeating steps (g) and (h) until no said additional data and metadata are found; and
   validating given data by executing steps comprising:
   comparing the data from search targets that have been searched, and
   selecting as valid the data from a source considered to be most reliable and usable, based on a set of precedence and usage rules.

2. A method for searching for data relevant to an inquiry, comprising using a computer to perform the steps of:
   a) providing a plurality of initial search targets based upon said inquiry of a plurality of seed sources;
   b) searching a first one of the plurality of initial search targets to obtain data and metadata relevant to the inquiry;
   c) repeating step (b) until all said data and metadata of the first one of the plurality of initial search targets have been collected and stored;
   d) searching a next one of the plurality of initial search targets to obtain additional data and metadata relevant to the inquiry;
   e) repeating step (d) until all said additional data and metadata of the next one of the plurality of initial search targets have been collected and stored;
   f) repeating steps (d) and (e) until all of the plurality of initial search targets have been searched and said additional data and metadata have been collected and stored;
   g) processing said data and metadata and said additional data and metadata stored in steps (c) and (e), respectively, thereby generating additional search targets;
   h) repeating steps (b) through (f) for said additional search targets; and
   i) repeating steps (g) and (h) until no said additional data and metadata are found; and
   validating given data by executing steps comprising:
   comparing the data from search targets that have been searched, and
   selecting as valid the data from a source considered to be most reliable and usable, based on a set of precedence and usage rules.

3. The method of claim 2, wherein the computer is configured to search web sites or other sources, and the list of seed sources is a list of web sites or other sources.

4. The method of claim 2, further comprising cleansing data acquired from a search target.

5. The method of claim 4, wherein the cleansing of data is performed by steps including at least one of removing erroneous values for the data, and removing predetermined tokens from the data.

6. The method of claim 2, further comprising curating, adjudicating, synthesizing, and clustering related data from different sources to form clustered data records.

7. The method of claim 6, further comprising generating composite multisource data records from sets of clustered data records.

8. The method of claim 2, further comprising performing at least one selected from the group consisting of writing to a database, archiving in a database, generating a report and publishing results that were found by searching for data relevant to the inquiry.

9. The method of claim 2, further comprising applying an analytical method of at least one selected from the group consisting of rules, algorithms, heuristics, and other analytic functions to make decisions with respect to the data, and a decision as to whether to continue or to terminate the method.

10. The method of claim 2, wherein the computer performs steps further comprising:
    reading data in the initial search targets and any additional search targets;
    comparing the data to rules in a processing rules list, storing data that conform to the rules as input business records;
    parsing the input business records using data in a reference data list to produce output business records;
    storing the output business records comprised of pieces of data.

11. The method of claim 10, wherein the computer performs steps further comprising:
    creating unique keys for each piece of data;
    determining correlations between non-correlated pieces of data in different output business records;
    generating a match key to identify a contextual value of each piece of data;
    grouping matching pieces of data into clusters based on the match keys;
    synthesizing the clusters into a series of composite records in accordance with precedence rules in a precedence rules list.

12. The method of claim 11, wherein the computer performs the step further comprising:
    using the precedence rules to determine the veracity of data or metadata obtained from one site, based on data or metadata from another site.

13. A computer system having a processor and a memory, the memory having instructions for causing the processor to search for data relevant to an inquiry, by performing steps comprising:
    a) providing a plurality of initial search targets based upon said inquiry of a plurality of seed sources;
    b) searching a first one of the plurality of initial search targets to obtain data and metadata relevant to the inquiry;
    c) repeating step (b) until all said data and metadata of the first one of the plurality of initial search targets have been collected and stored;

d) searching a next one of the plurality of initial search targets to obtain additional data and metadata relevant to the inquiry;

e) repeating step (d) until all said additional data and metadata of the next one of the plurality of initial search targets have been collected and stored;

f) repeating steps (d) and (e) until all of the plurality of initial search targets have been searched and said additional data and metadata have been collected and stored;

g) processing said data and metadata and said additional data and metadata stored in steps (c) and (e), respectively, thereby generating additional search targets;

h) repeating steps b) through f) for said additional search targets;

i) repeating steps (g) and (h) until no said additional data and metadata are found; and j) validating given data by executing steps comprising:
comparing the data from search targets that have been searched, and
selecting as valid the data from a source considered to be most reliable and usable, based on a set of precedence and usage rules.

14. The system of claim 13, wherein the computer is configured to search web sites or other sources, and the list of seed sources is a list of web sites or other sources.

15. The system of claim 13, wherein the computer is configured to cleanse data acquired from each search target.

16. The system of claim 15, wherein the computer is configured to cleanse data by steps including at least one of removing erroneous or inappropriate values for the data, and removing predetermined tokens from the data.

17. The system of claim 13, further comprising a processor configured to curate, adjudicate, synthesize, and cluster related data from different search targets to form clustered data records.

18. The system of claim 17, wherein the processor is configured to generate a composite data record from the clustered data records.

19. The system of claim 13, wherein the computer performs steps further comprising:
reading data in the initial search targets and any additional search targets;
comparing the data to rules in a processing rules list, storing data that conform to the rules as input business records;
parsing the input business records using data in a reference data list to produce output business records;
storing the output business records comprised of pieces of data.

20. The system of claim 19, wherein the computer performs steps further comprising:
creating unique keys for each piece of data;
determining correlations between non-correlated pieces of data in different output business records;
generating a match key to identify a contextual value of each piece of data;
grouping matching pieces of data into clusters based on the match keys;
synthesizing the clusters into a series of composite records in accordance with precedence rules in a precedence rules list.

21. The system of claim 20, wherein the computer performs the step further comprising:
using the precedence rules to determine the veracity of data or metadata obtained from one site, based on data or metadata from another site.

\* \* \* \* \*